INVENTOR.
RICHARD D. LIVINGSTON
BY
ATTORNEYS

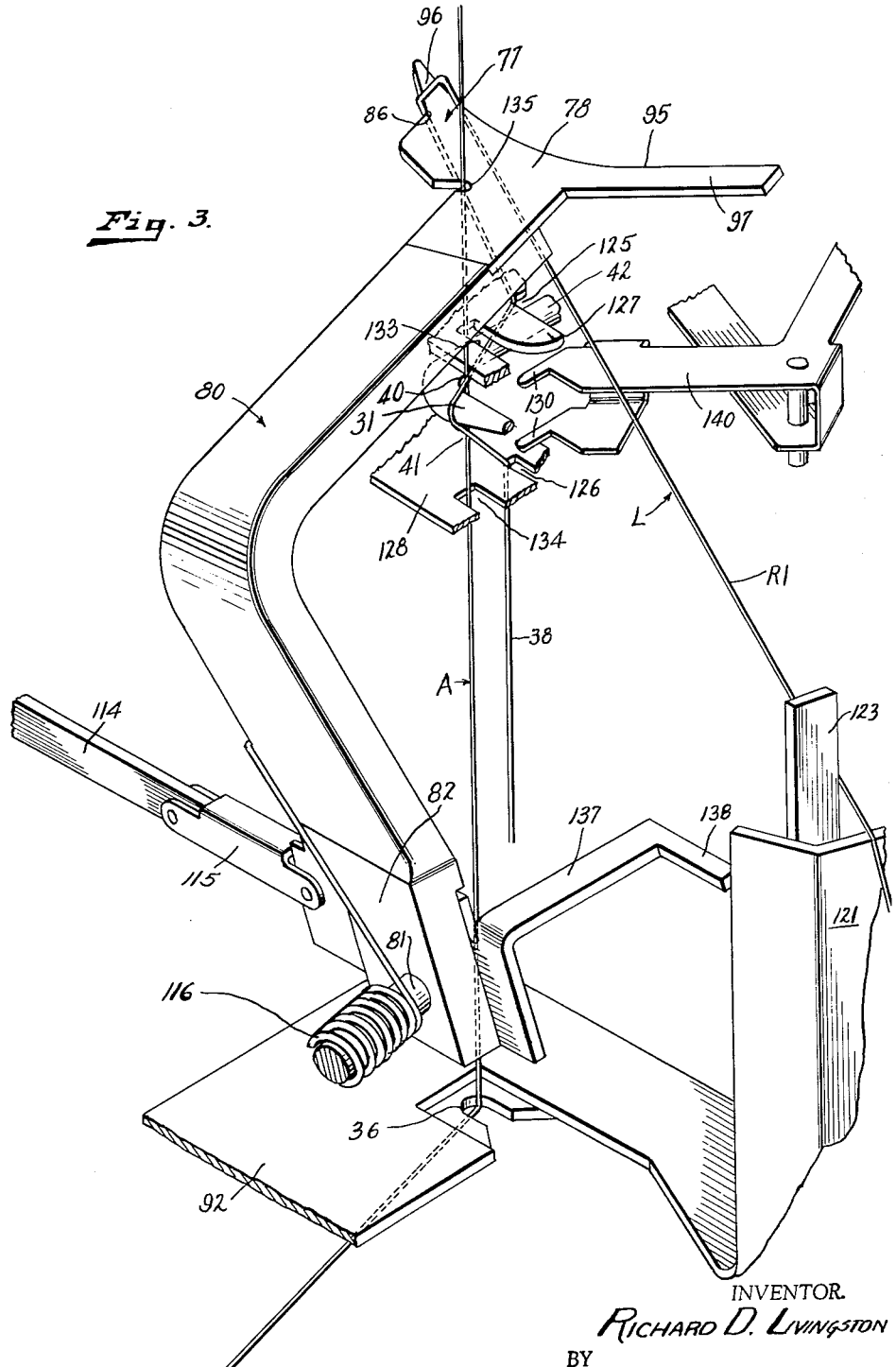

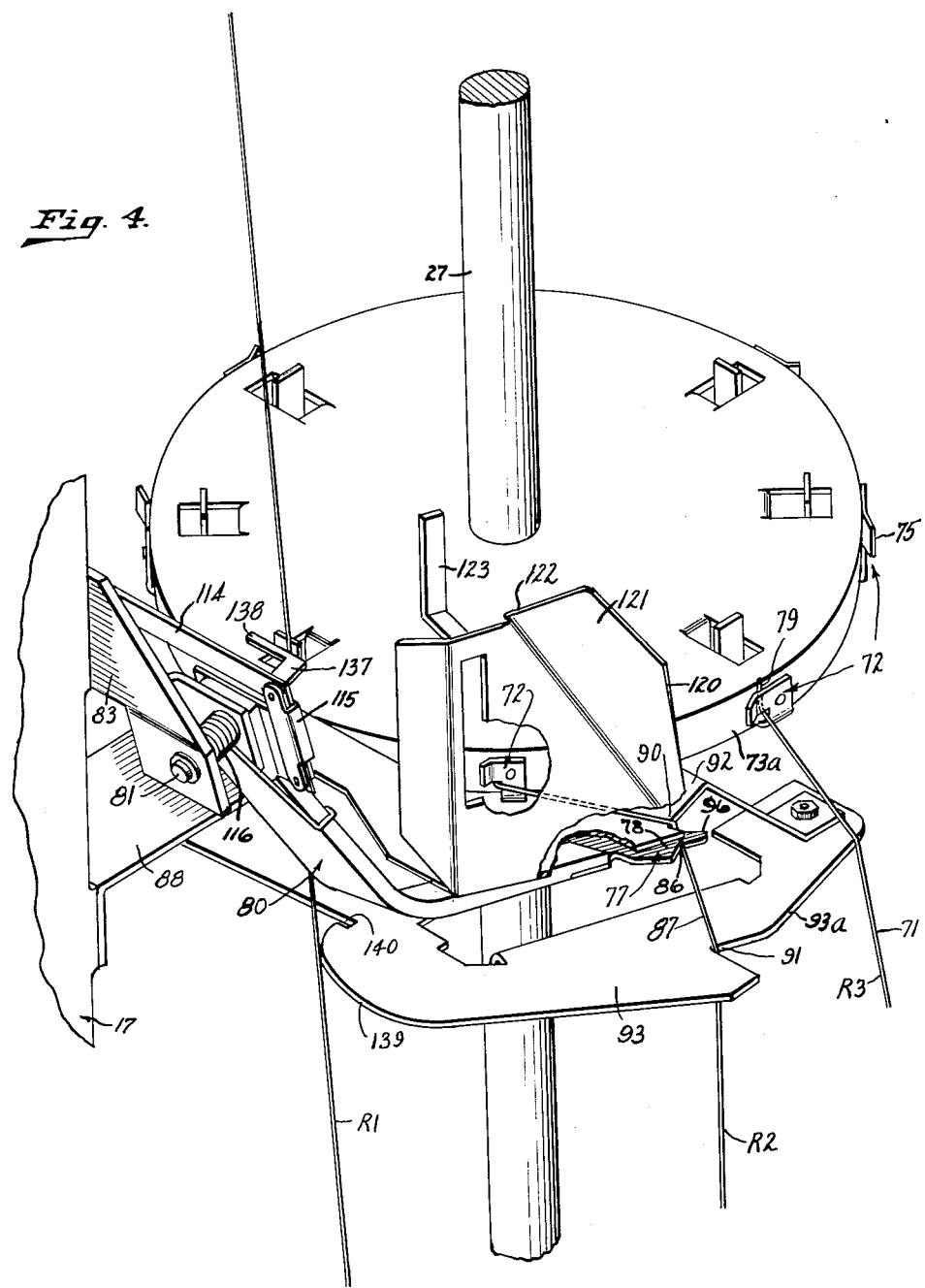

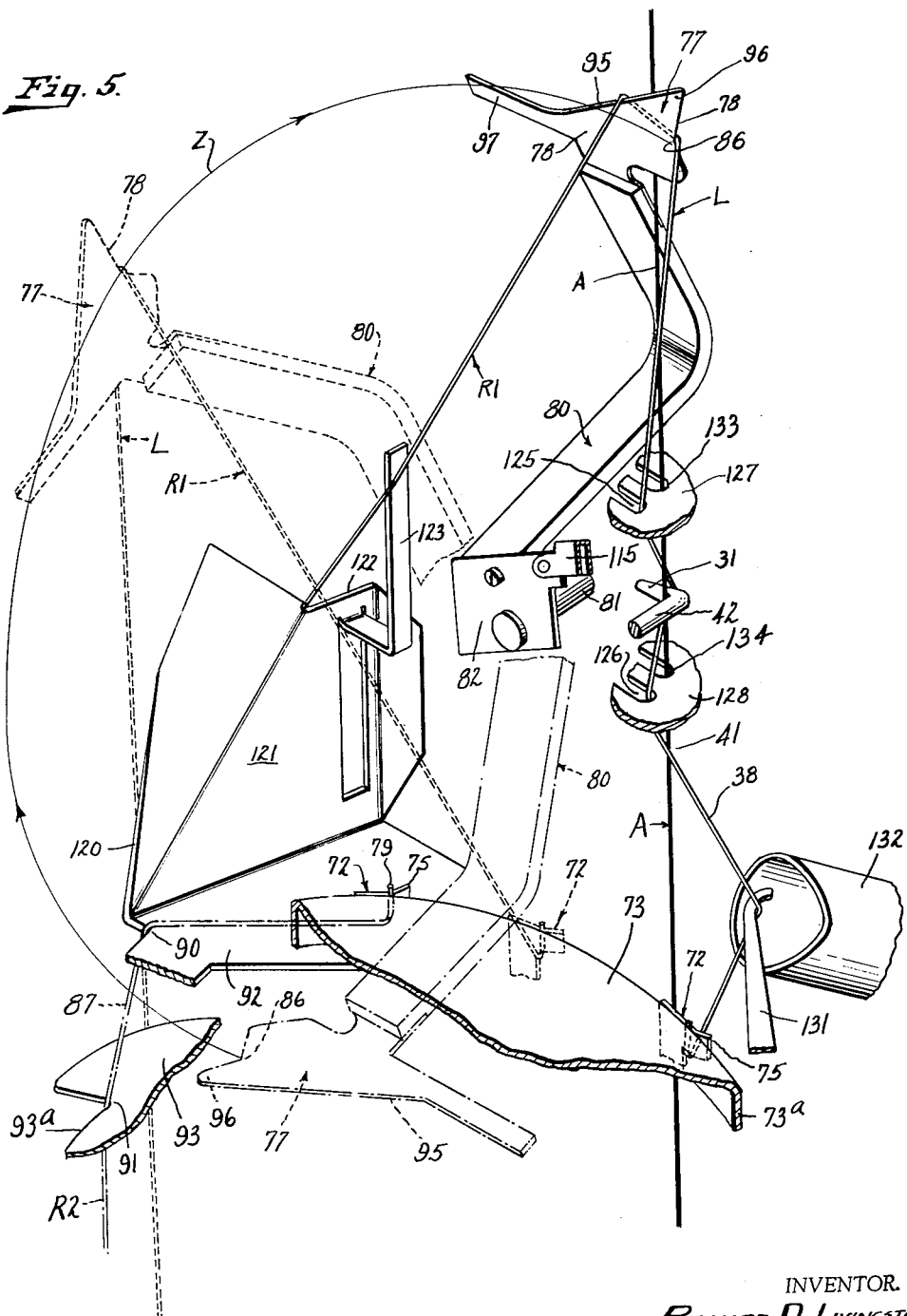

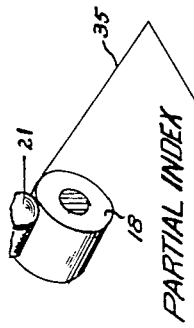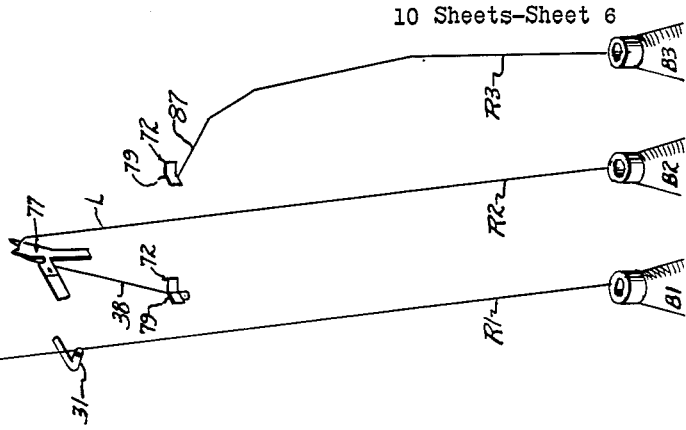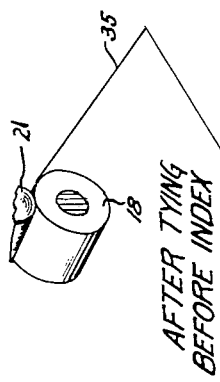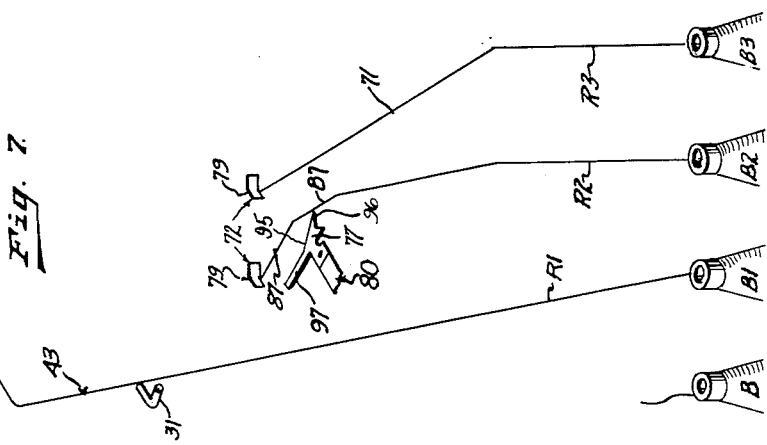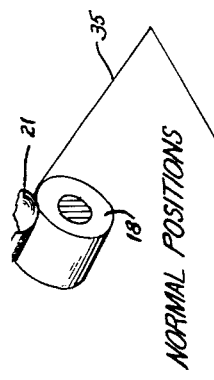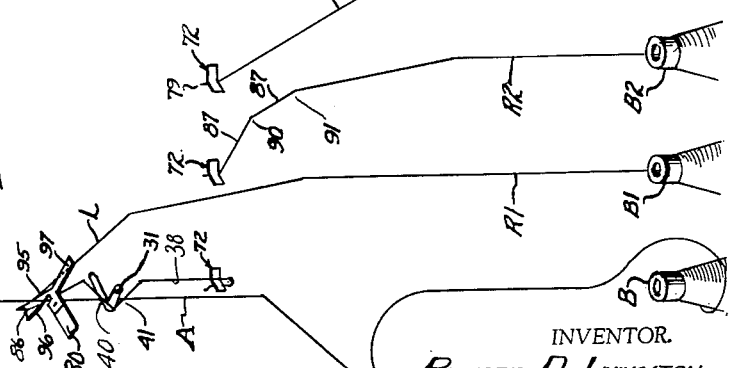

July 26, 1966 R. D. LIVINGSTON 3,262,648
HIGH SPEED WINDER
Filed April 13, 1964 10 Sheets-Sheet 7

INVENTOR.
RICHARD D. LIVINGSTON
BY
Wolfe, Hubbard, Voit & Osann
ATTORNEYS

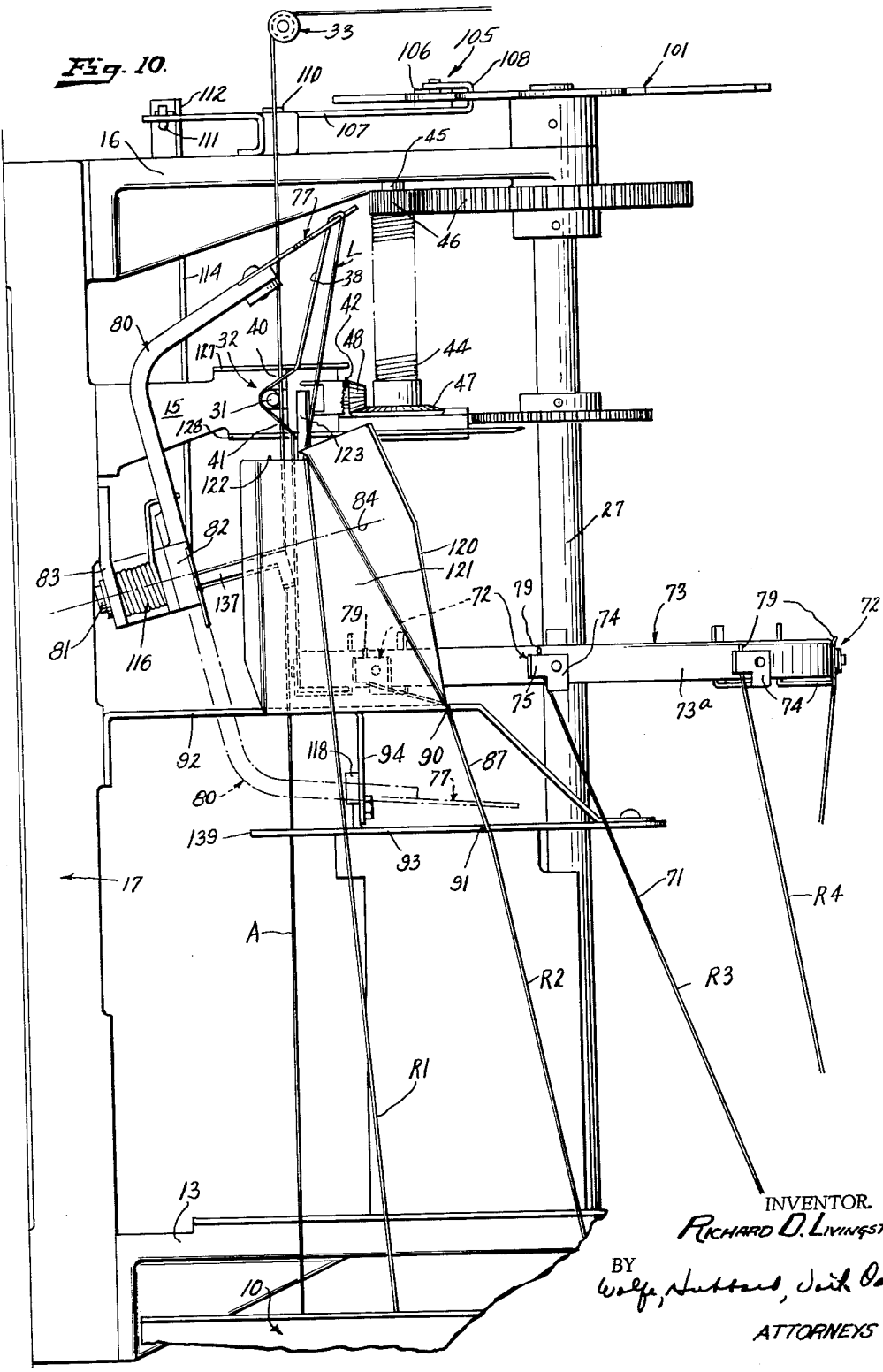

July 26, 1966  R. D. LIVINGSTON  3,262,648
HIGH SPEED WINDER
Filed April 13, 1964  10 Sheets-Sheet 9
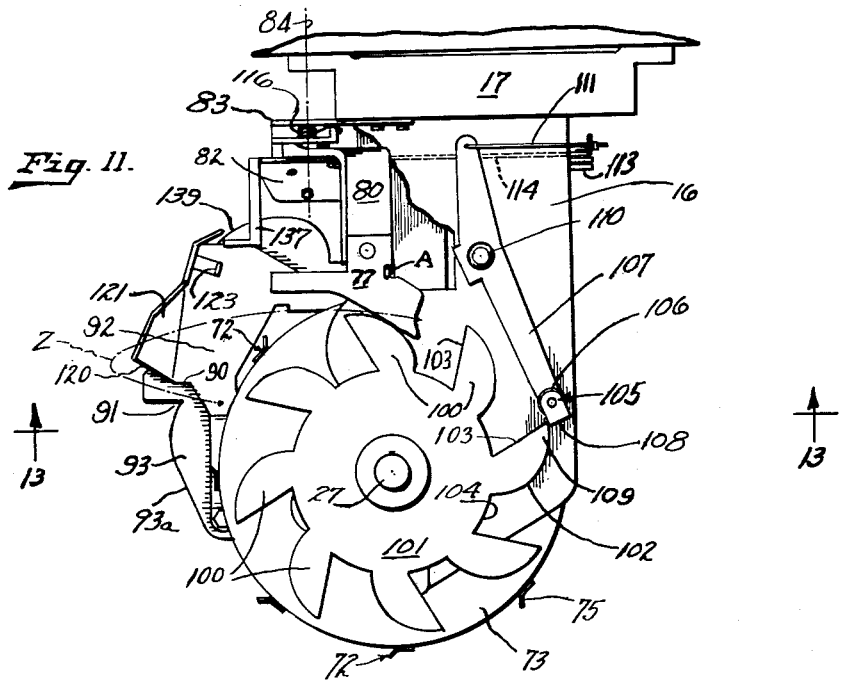
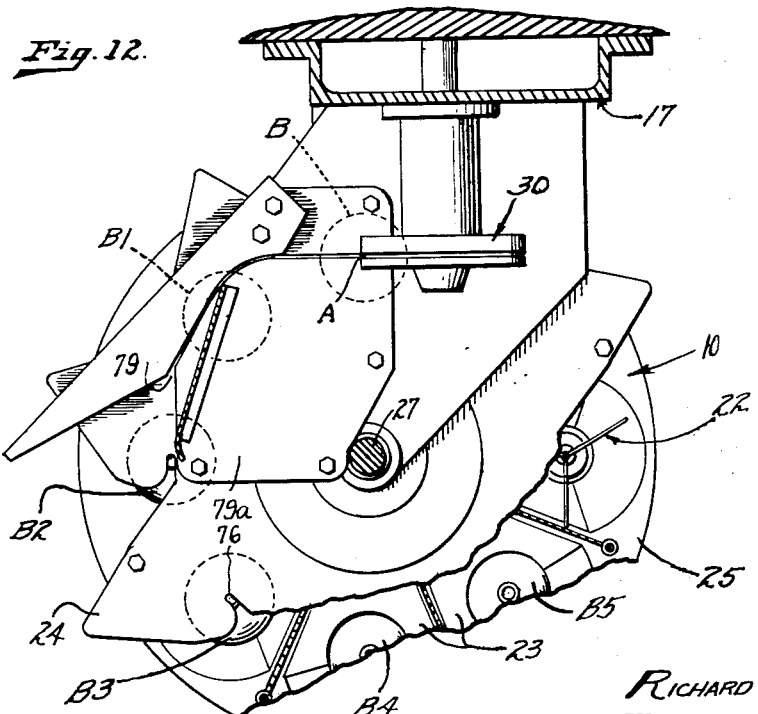
INVENTOR.
RICHARD D. LIVINGSTON
BY
Wolfe, Hubbard, Voit & Osann
ATTORNEYS

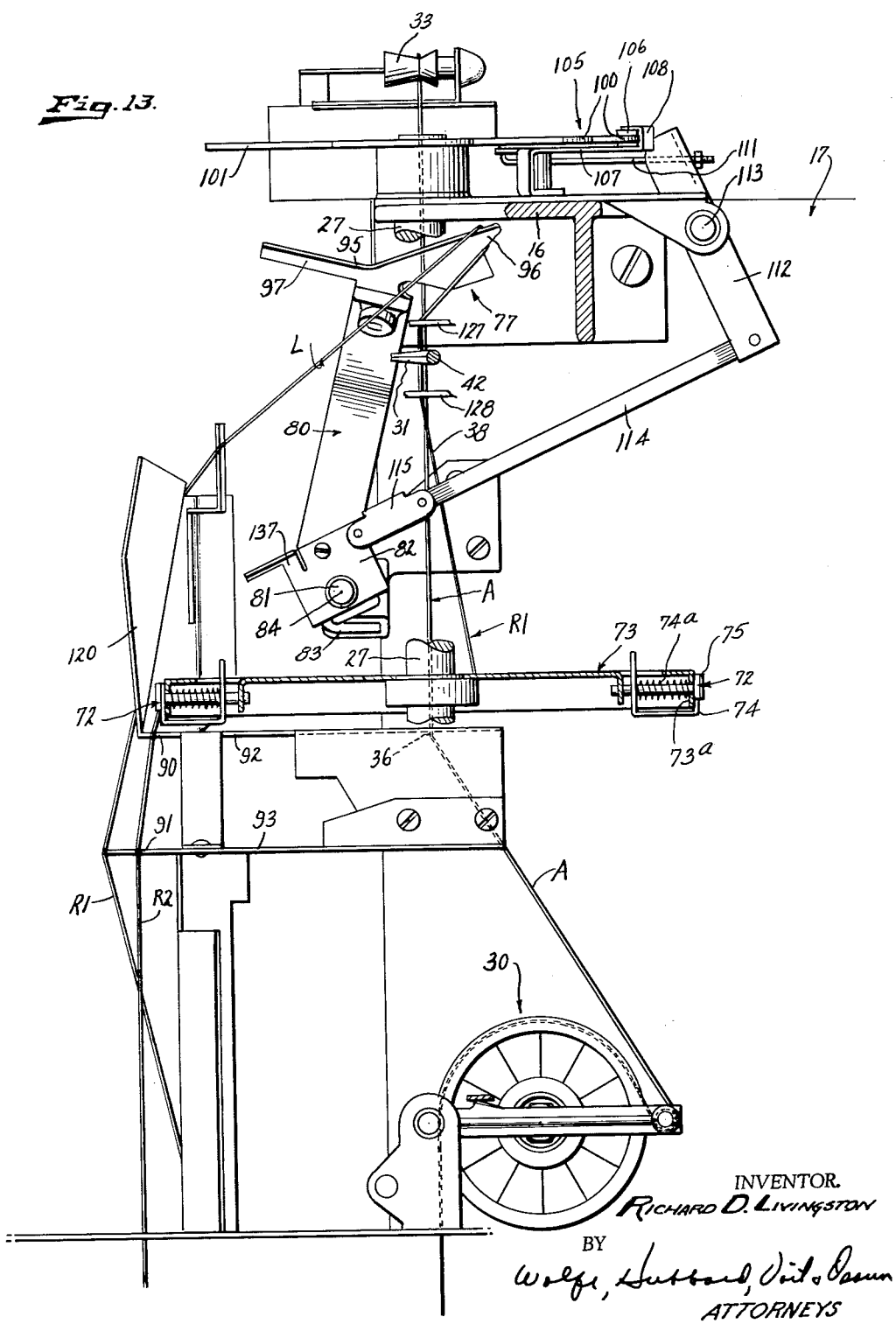

United States Patent Office 3,262,648
Patented July 26, 1966

3,262,648
HIGH SPEED WINDER
Richard D. Livingston, Rockford, Ill., assignor to Barber-Colman Company, Rockford, Ill., a corporation of Illinois
Filed Apr. 13, 1964, Ser. No. 359,070
22 Claims. (Cl. 242—35.6)

This invention relates to a winder of the type disclosed in Patents 3,017,128 and 3,017,129 in which a running thread being wound at high speed to form a cheese or cone travels past the bill of a knotter, and an unwound length of thread from a reserve bobbin is held during the winding in proper relation to the bill for tying of the two together instantaneously by firing of the knotter in response to interruption of the running thread whereby to continue the winding without interruption. In the patented winder, a series of reserve bobbins are loaded manually into a magazine, which after each knotter operation is indexed one step to reload the knotter actuator and locate the new running thread and the first reserve thread in proper positions relative to the knotter bill in anticipation of the next thread break.

In loading a bobbin into the magazine in the patented winder, the operator must draw the bobbin thread first upwardly and over guides on the magazine and then downwardly into a clamp and thus hang up the thread in the form of an inverted J with a short and leading leg thereof positioned for association with the knotter bill in a subsequent indexing step of the magazine.

The primary object of the present invention is to greatly simplify the motions required to be performed by the operator in hanging up the threads of the reserve bobbins thus reducing labor costs in the operation of winders of the patented type.

A more detailed object is to provide for manual hanging up of the reserve threads in relatively short lengths extending only upwardly from the bobbins and for automatically drawing the unwound length of the second reserve thread into an inverted loop of the desired shape during the indexing of this thread into association with the knotter.

The invention also resides in the novel and simple construction of the mechanism for drawing, shaping and positioning the inverted loop.

Other objects and advantages of the invention will become apparent from the following detailed description taken in connection with the accompanying drawings, in which FIGURE 1 is a side elevational view of a winder embodying the novel features of the present invention.

FIG. 3 is an enlargment of a part of FIG. 2.

FIG. 4 is a similar perspective showing of a different position of the parts.

FIG. 5 is a fragmentary perspective view similar to FIG. 3 but at a different angle.

FIGS. 6, 7 and 8 are schematic development views showing the threads of a series of the bobbins.

FIG. 10 is an enlargement of part of FIG. 1.

Figure 1:
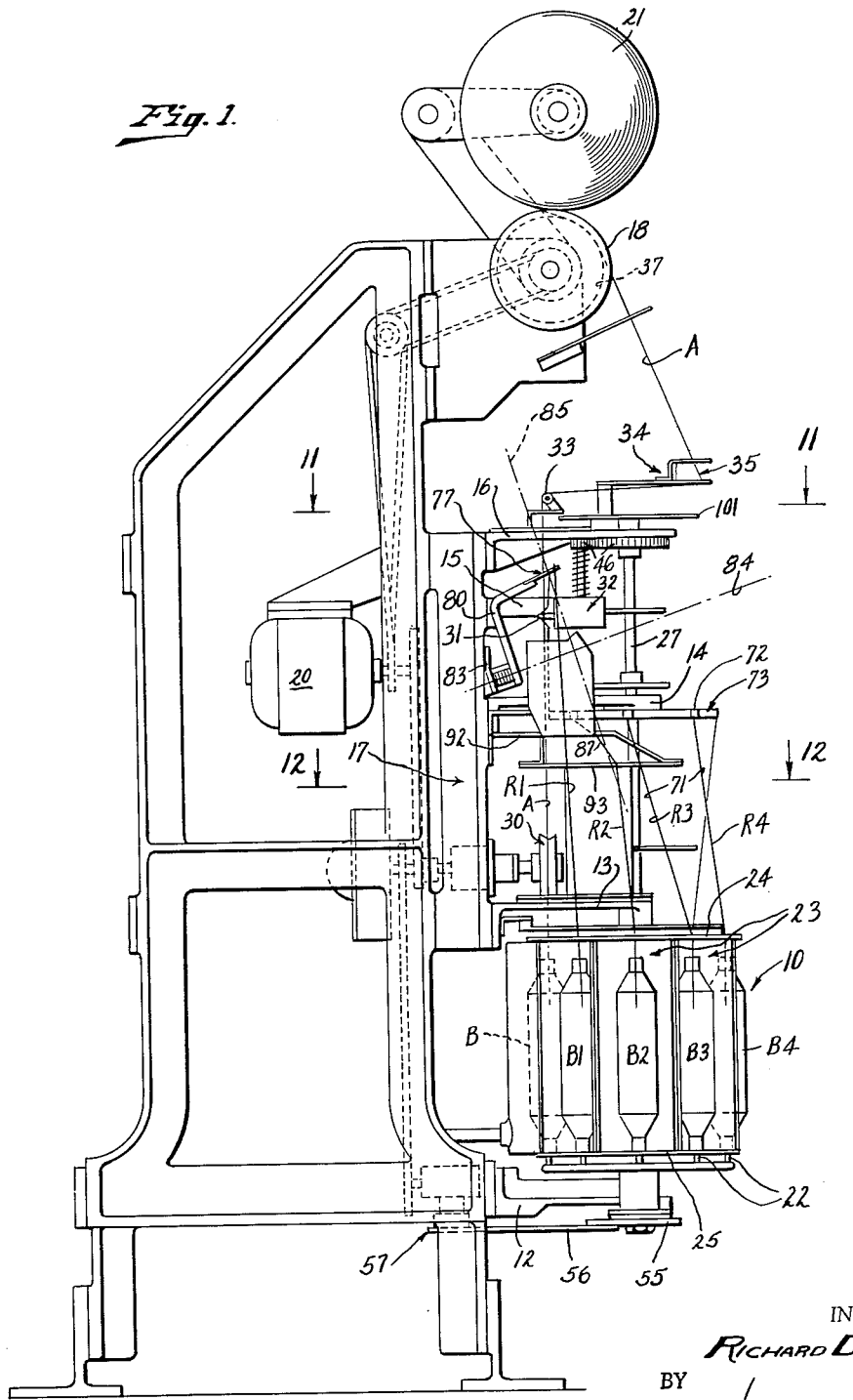

FIGS. 11 and 12 are fragmentary plan sections taken along the lines 11—11 and 12—12 of FIG. 1.

FIG. 13 is a fragmentary section taken on the line 13—13 of FIG. 11.

Generally stated, the present improvement in the winder disclosed in the above mentioned patents involves the manner in which the threads R1–R4 (FIGS. 1, 2, 6 and 10) of a plurality of reserve bobbins B1–B4 are hung up on an indexable magazine 10 and the first reserve thread R1 is drawn into an inverted loop L during the indexing of the magazine to bring the first reserve bobbin into the winding station following breaking or exhaustion of the running thread A of the active bobbin B at such station. Apart from these novel features, the winder construction is essentially the same as that shown in the above patents to which reference may be made for further details.

The magazine and all of the operating parts are supported on a frame comprising brackets 12 to 16 projecting horizontally and forwardly from an upright standard 17 on top of which is journaled a grooved drum 18 driven by a motor 20 and supporting a thread package such as a cheese 21 while rotating the latter to draw a thread A upwardly from the active bobbin B dwelling in the winding station immediately in front of the standard. The active and reserve bobbins are supported in upright positions on skewers 22 (FIGS. 1 and 12) in the bottoms of outwardly opening pockets 23 equidistantly spaced around the magazine between the top and bottom plates 24, 25 thereof which are fixed to the lower end portion of a vertical shaft 27. The latter extends vertically through and is journaled in the several frame brackets.

In traveling from the active bobbin B to the cheese, the running thread A moves through a detecting device 28 (FIG. 2) for sensing interruption of the thread and then passes around a rotary so-called tension reducer 30 beyond which the thread extends upwardly past a guide 36 and then along a vertical path past the inner side of the bill 31 of a knotter 32 (FIGS. 1 and 10). Above the latter, the thread runs around a roller 33, through a device 34 for maintaining a releasable slack loop 35 and then to the cheese through the traversing groove 37 of the winding drum 18.

As in the patented winder and during the winding, the short leg 38 of the inverted loop L of the first reserve thread R1 lies alongside of and close to the running thread A and crosses the latter at points 40 and 41 above and below the knotter bill which projects laterally from the outer end of a radially extending shaft 42 journaled on the frame a substantial distance above the magazine. The bill projects tangentially along but reversely to the arcuate path of advance of the thread loop L in the final part of each indexing step of the magazine in the clockwise direction as viewed in FIG. 2.

Figure 9:
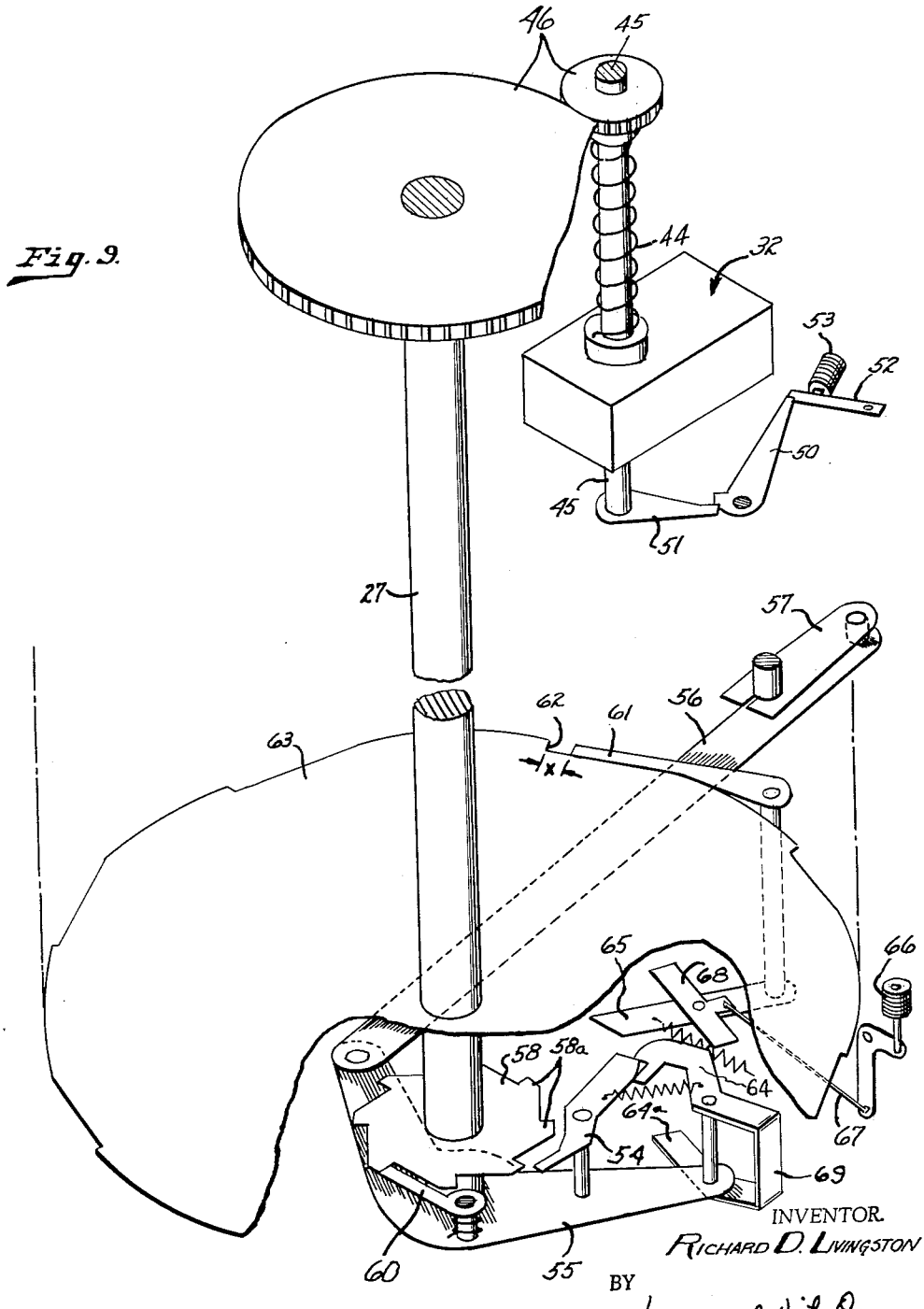
FIG. 9 is a fragmentary perspective view of the magazine indexing and the knotter actuating mechanisms.

The two threads A and R1 are thus positioned during the winding for instantaneous tying together by a weaver's knot 43 (FIG. 7) in a revolution of the knotter shaft by a load and fire mechanism including a torsion spring 44 (FIGS. 9 and 10) encircling a jackshaft 45 journaled in the brackets 15 and 16 and fixed to one end of the spring, the shaft being coupled through gears 46 to the magazine shaft 27. The other spring end is fixed to a bevel gear 47 meshing with a pinion 48 on the inner end of the knotter shaft. As fully described in the aforesaid patents, the spring is wound up during the magazine indexing and the tension is maintained by a latch 50 (FIG. 9) engaging an arm 51 when the knotter bill is in the normal horizontal position. The latch is held in set position by a detent 52 which is retracted by a magnet 53 to trip the latch in response to a signal from the detector 28 that the running thread has broken or exhausted.

Preferably, the bobbin magazine is indexed by the same ratchet mechanism (see FIG. 9) described in the patent and comprising a pawl 54 on a bell-crank 55 which, through a link 56 (FIGS. 1 and 9), is oscillated back and forth around the shaft 27 by a crank 57 driven continuously by the motor 20. The pawl coacts with a ratchet wheel 58 fast on the shaft and having teeth 58a spaced according to the spacing of the bobbins in the magazine and coacting under the force of the knotter spring 44 with a detent 60 to determine each dwell position of the magazine. A pawl 61 pivoted on the frame coacts at its free end with radial shoulders 62 on a disk 63 fast on the shaft 27 to allow the magazine to snap ahead a short distance X simultaneously with the completion of the knotter cycle and by a torque derived from the inertia of the knotter and connected parts as the spring 44 becomes unwound and then is wound reversely to absorb the energy and arrest the knotter motion.

During normal winding, the pawl 54 is held out of engagement (FIG. 9) with the teeth 58$^a$ during the forward and return strokes of the crank by a latch 64 mounted on the oscillating arm 55 and having a projection 64$^a$ which engages a lever 65 to move the pawl 61 outwardly during the latter part of each return stroke of the crank and a short part of the next stroke. When the detector 28 senses a thread break and fires the knotter, a magnet 66 is also energized and acts through a link 67 to rock a lever 68 on the lever 65 into the path of a part 69 on the oscillating pawl 64, the latter thus being retracted to permit the pawl 54 to move into engagement with the teeth 58$^a$. During the next active stroke of the crank, the pawl 54 is effective to index the shaft 27 and thus move the exhausted bobbin out of the winding position and bring the first reserve bobbin B1 into this position.

In the patented machine, it is necessary for the operator, while depositing a reserve bobbin in a magazine pocket 23, to unwind a substantial length of the thread thereof and draw the same first upwardly and around an arcuate flange (116 in FIG. 3 of the patent) and then downwardly to a clamp on the magazine. The thread of each reserve bobbin is thus hung-up on the magazine shaft in an inverted loop of J-shape later carried into association with the knotter in this shape. These several motions are time consuming and in addition the substantial length of thread left unsupported is difficult to maintain taut and always in proper position on the hang-up flange.

The present invention overcomes all of these objections by permitting the operator to unwind and hang up a relatively short and substantially straight length 71 of each reserve thread in a single upward motion to a supporting clamp 72 and providing for conversion of the second reserve thread R2 into the desired inverted loop L automatically by the indexing step of the magazine in which the second reserve bobbin B2 is carried to the first reserve position and its thread becomes the first reserve thread as it is brought into operative association with the knotter bill during completion of the indexing.

To these ends, a circular disk 73 of about the same diameter as the magazine having a depending peripheral flange 73$^a$ is fast on the magazine shaft 27 and spaced a substantial distance, about eleven inches in the present instance, above the top plate 24 of the magazine and well below the level of the knotter 32 (see FIG. 1). Equidistantly spaced around the disk are the clamps 72 each of which comprises a finger 74 (see FIG. 13) urged by a spring 74$^a$ against the flange 73$^a$ and having an end 75 curving away from the flange and extending circumferentially in the direction of the magazine indexing. After each new bobbin is placed on an empty skewer 22 in a magazine pocket, its thread is drawn upwardly into and through a guide throat 76 (FIG. 2) in the top disk 24, then upwardly and laterally between the finger end 75 and the flange 73$^a$ of the corresponding clamp 72 which grips the thread while it is being broken off leaving the end 79 held in the clamp. The unwound length of each thread thus hung up on the edge of the disk 73 will be shaped as at R3 in FIGS. 2 and 6. In the rest portion of the magazine during normal winding, the active and reserve threads A, R1, R2 and R3 are shaped as shown schematically in FIG. 6 by engagement with the various guide and supporting parts. At this time, the second reserve thread R2 is disposed in a V-shaped throat 79 (FIG. 2) in stationary plates 79$^a$ defining a slot 79$^b$ by which the long leg of the first reserve thread R1 is led into engagement with the detector 28 and the tension reducer 30 as the bobbin B2 is indexed first to the first reserve position and then, after the next thread break, on to the winding station, the same as in the patented winder.

In its broadest aspect, the present invention provides a mechanism actuated as an incident to indexing of the magazine following a thread break to draw the inverted loop L in the second reserve thread R2 and present the leading short leg 38 thereof in proper relation to the various guides and positioning devices of the patented winder. This mechanism includes a member indicated generally at 77 mounted for movement during one or more of the magazine indexing steps from a lower position (FIGS. 4 and 7) opposite the thread R2 to a normal upper position (FIGS. 1, 2, 3, 5 and 6) adjacent and somewhat beyond the knotter bill 31. While a plurality of such loop drawing members may be employed and arranged to move in an endless path through the lower and upper positions, it is preferred to employ a single member arranged to draw the loop L in a forth and back motion executed as an incident to each indexing of the bobbin magazine.

In the form shown, the member 77 comprises a finger 78 projecting laterally from the free end of an arm 80 pivoted at its other end on the winder frame and supporting the finger for movement back and forth along an arcuate path Z (FIG. 5) extending nearly a half revolution between an upper normal position (FIGS. 2, 3 and 5) adjacent and just beyond the bill of the knotter and a lower or pick-up position (FIG. 4) opposite the thread R2 on the inner side of the latter. Except for these two terminal positions, the finger in traversing the arcuate path is disposed outside of the paths traversed by the second reserve thread R2 during drawing of the loop L therein and while the parts of the loop are being guided into proper association with the knotter bill. To dispose the arm and its mounting outside of these thread paths while supporting the finger 78 for movement along the arcuate path Z, the arm is L-shaped and nearly right angular in the present instance and somewhat shorter than the spacing of the knotter bill 31 above the clamp disk 73.

The flattened end 82 of the longer leg of the L is fast on a pivot shaft 81 extending through and journaled in spaced plates 83 (FIG. 4) secured to the front face of the standard 17. The pivot axis 84 (see FIG. 1) extends forwardly and across the top of the magazine adjacent the shaft 27 and is inclined upwardly somewhat to provide for swinging of the member 77 in a plane 85 through the arc Z (FIGS. 5 and 11) which converges upwardly toward the running thread A from the point of engagement of the finger 78 with the thread R2 and intersects this thread somewhat above the knotter bill. Also, as shown in FIG. 11, the pivot axis 84 is disposed between the active and first reserve bobbins B, B1.

To pick up the thread R2 and draw and hold the loop L therein, the finger 78 is formed at its end with a shallow V-shaped notch 86 which, in the upper normal position of the finger is disposed just beyond the knotter bill and opens in the direction of the magazine indexing. In the lower or pick-up position, the notch 86 is disposed inside of and opens outwardly toward a portion 87 of the second reserve thread R2 on the magazine. This portion is spaced a short distance backwardly from the clamped leading end 79 of this thread and, in the present instance, is drawn taut between and positioned by the bottoms of two vertically spaced and stationary guide throats 90 and 91 into which the thread was carried in the previous indexing step. These throats are on horizontal plates 92 and 93 (FIG. 4) fixed to the frame standard 17, the throat 90 being spaced slightly ahead of the throat 91. During each indexing motion, the third reserve thread R3 encounters an incline 93$^a$ (FIGS. 2 and 4) on the lower plate 93 and is led thereby into the throat 91 where it stops as the clamp 72 of this thread continues on to final position (FIG. 10) after a portion of the thread closer to the clamp encounters and becomes seated in the upper throat 90.

The length 87 of the second reserve thread thus accurately positioned is disposed in the plane 85 in which the notch 86 swings inwardly in approaching its lower or pick-up position (FIG. 4) during which the notch passes the thread length 87 and comes to rest just inside the latter as shown in dot-dash outline in FIG. 5 with the notch opening outwardly. In the final downward movement of the arm 80, the outer side edge 95 of the pick-up finger 78 encounters the thread length 87 and, by virtue of its incline and disposal in the plane of the notch 86, this edge cams the thread laterally until the thread passes the outer tip 96 of the notch. The thread is then under sufficient tension to move laterally back into the plane 85 and in front of the notch so as to be ready to be picked up by the latter in the reverse or upward movement of the arm 80. The incline 95 terminates along the side of a tail 97 projecting from the arm in a direction opposite the notch finger 78.

The loop drawing arm 80 is moved from its upper to its lower position after the knotter has been fired but before the start of the magazine indexing by the crank actuated pawl 54 (FIG. 9) above described and, during the ensuing indexing, is swung upwardly to draw the inverted loop L in the advancing thread R2 and carry the depending short leg 38 thereof into the various guides by which the thread is brought into proper association with the knotter bill 31, the construction and arrangement of these guides being the same as in the patented winder. Thus, in the final position of the arm 80, the upper closed end of the thread loop straddles the tip 96 of the notch 86 as shown in FIGS. 2, 3, 5, 10 and 13, which tip supports the loop in the same position relative to the knotter bill and the running thread A as the leading end of the magazine flange 116 does in the patented machine (see FIG. 3 of the patent).

Various mechanisms may be employed to move the loop drawing member 77 from its lower position to the upper position. When the member is a swinging arm, it may be lowered and raised by a suitable system of links and levers actuated from the indexing crank 57 during its return and forward strokes. In the present instance, however, both motions are controlled by cam lobes 100 angularly spaced to correspond to the spacing of the magazine pockets and formed around the periphery of a disk 101 fixed to the main shaft 27 above the knotter gear 46. Each lobe has a gradual rise 102 along its leading edge terminating at an abrupt fall 103 at the leading end of a dwell surface 104. The lobes coact with a follower 105 (FIGS. 2, 10, 11 and 13) comprising a roller 106 journaled within the bent-over end portion of a lever 107 whose end 108, after the roller has ridden up a rise 102, engages the tip 109 of one lobe in the rest position of the magazine. The lever 107 is disposed horizontally and fulcrumed intermediate its ends on a pivot 110 on the bracket 16. At its opposite end, the lever is connected through a link 111 with the upper short end of an upright lever 112 fulcrumed on a pivot 113 which parallels the pick-up arm pivot 81 and is mounted on the bracket 16 around the index path and beyond the winding position (see FIG. 13). The lower end of the lever 112 is connected to one end of an elongated link 114 inclined downwardly and reversely of the index motion with its other end pivotally coupled above the pivot 81 and through a short link 115 to a flattened end 82 of the pick-up arm 80.

A torsion spring 116 coiled about the pivot 81 urges the arm counterclockwise as viewed in FIG. 13 and toward the lower or pick-up position which is determined by engagement of the follower roller 106 with one of the dwell surfaces 104 on the cam disk 101. In the normal rest position of the magazine, this follower end is disposed at the extreme outer or trailing end 109 of the rise 102 (see FIGS. 2 and 11) on one lobe 100. With the roller thus positioned, the quick advance of the magazine as above described following firing of the knotter will step the cam disk 101 ahead far enough to carry the tip of the lobe past the follower end 108 thus allowing the same to move inwardly and the arm 80 to swing downwardly under the action of the torsion spring to the pick-up position which is determined by engagement of an intermediate portion of the arm with a stop in the form of a block 118 (see FIG. 10). At this time, the parts of the actuating linkage will be positioned as shown in full in FIG. 4, the links 114 and 115 being flexed relative to each other.

The parts remain in these positions until the magazine is picked up in the next forward stroke of the pawl 54 (FIG. 9) to initiate the main indexing of the magazine and the thread clamps movable therewith as above described. When the leading end of the cam rise 102 encounters the follower 105 and starts to move the same outwardly, the levers 107 and 112 are rocked to pull the link 114 and initiate upward swinging of the arm 80 which continues for the remainder of the index motion. In the first part of this movement, the thread length 87 is picked up by the notch 86 which is moved outwardly between the plates 92 and 93 thus carrying the part 87 of the thread horizontally and out of the upper and lower guide throats 90 and 91 and allowing the same to come against the edge 120 of an upright stationary plate 121 integral with and upstanding from the inner edge of the upper guide plate 92. This plate is disposed just outside of and curves around the clamp disk 72 and toward the winding station.

As the upward movement of the arm 80 continues with the end of the thread R2 held in its advancing clamp 72, additional thread is unwound from the bobbin B2 and the portion thereof between the bobbin and the notch slides upwardly along the edge 120 while remaining outside of and extending upwardly along the plate 121. The latter thus maintains the thread length which is to become the long leg of the inverted loop separated from the short leg which is disposed on the inside of the plate and extends downwardly from the notch 78 to its clamp 72 as shown in dotted outline in FIG. 5 after the member 77 has moved upwardly through about half of the arc Z during which it draws the inverted loop L.

As the upward swinging of the arm 80 is continued, the outer length of the thread R1 comes onto the top edge 122 of the plate 121 and moves laterally in the direction of the indexing along this edge until, as the member 77 approaches its final upper or normal position, comes against a stop in the form of a lug 123 upstanding from the plate 121 and acting to limit the advance of the long leg of the loop so long as the winding from the active bobbin continues without interruption.

By this time, the leading and short leg 38 of the loop will be disposed substantially vertically between the advancing notch 86 and its clamp 72 so as to enter the proper notches 125 and 126 (FIGS. 3 and 5) in stationary guides 127 and 128 the same as in the patented machine. As in the latter and just before the thread reaches the tip of the knotter bill 31, spaced points along the short leg of the loop L come against the positioning fingers 130 (FIG. 3) which are moved in an orbital path first outwardly to carry the intervening length of the thread past the tip and then inwardly to deposit the thread against the outer side of the bill. These fingers are on the end of a bell-crank 140, the mounting and timed actuation during indexing of the bobbin magazine are described fully in U.S. Patent No. 3,017,128. Upon retraction of the fingers 130 as the notch 86 reaches its final position, the positioned thread is tensioned between the guide notches by the action of the arm 131 (331 of the patent) swung outwardly as shown in FIG. 5 to carry a part of the thread adjacent its clamp 72 to a position opposite the end of a suction tube 132.

As a result of such positioning action and the final upward swinging of the arm 80, the short leg 38 of the inverted loop L between its clamp 72 and the notch 86 will be formed to the same shape and be positioned in the same relation with respect to the knotter bill 31 and the running thread A as in the patented winder. In this instance, however, the notch which is disposed directly above the winding station, faces in the direction of indexing and opposite to the knotter bill with the upper closed end of the inverted loop supported by the tip 96 of the finger 77. Thus, the first thread R1 extends as shown in FIGS. 1, 2, 3, 5 and 6 upwardly from its bobbin B1 through the magazine guide 76, the slot 79b in the stationary guide 79a, the outer edge of the lower guide plate 93, the top edge 122 of the plate 121 and against the lug 123, then upwardly across the wall of the notch 86 adjacent the tip 96 of the finger 77. After passing outwardly across the top of the tip 96, the thread extends downwardly past the guide 125 (see FIG. 5) outwardly around the knotter bill, down through the guide 126 and around the finger 131 adjacent the suction tube 132 and to the clamp 72 which is spaced about one index step short of the winding station. At the winding station, the running thread A extends upwardly through notches 133 and 134 in the guide plates 127 and 128, then through a notch 135 in the finger 78 opposite the notch 86 (see FIG. 3) and thus runs upwardly without rubbing contact with this finger.

Figure 2:
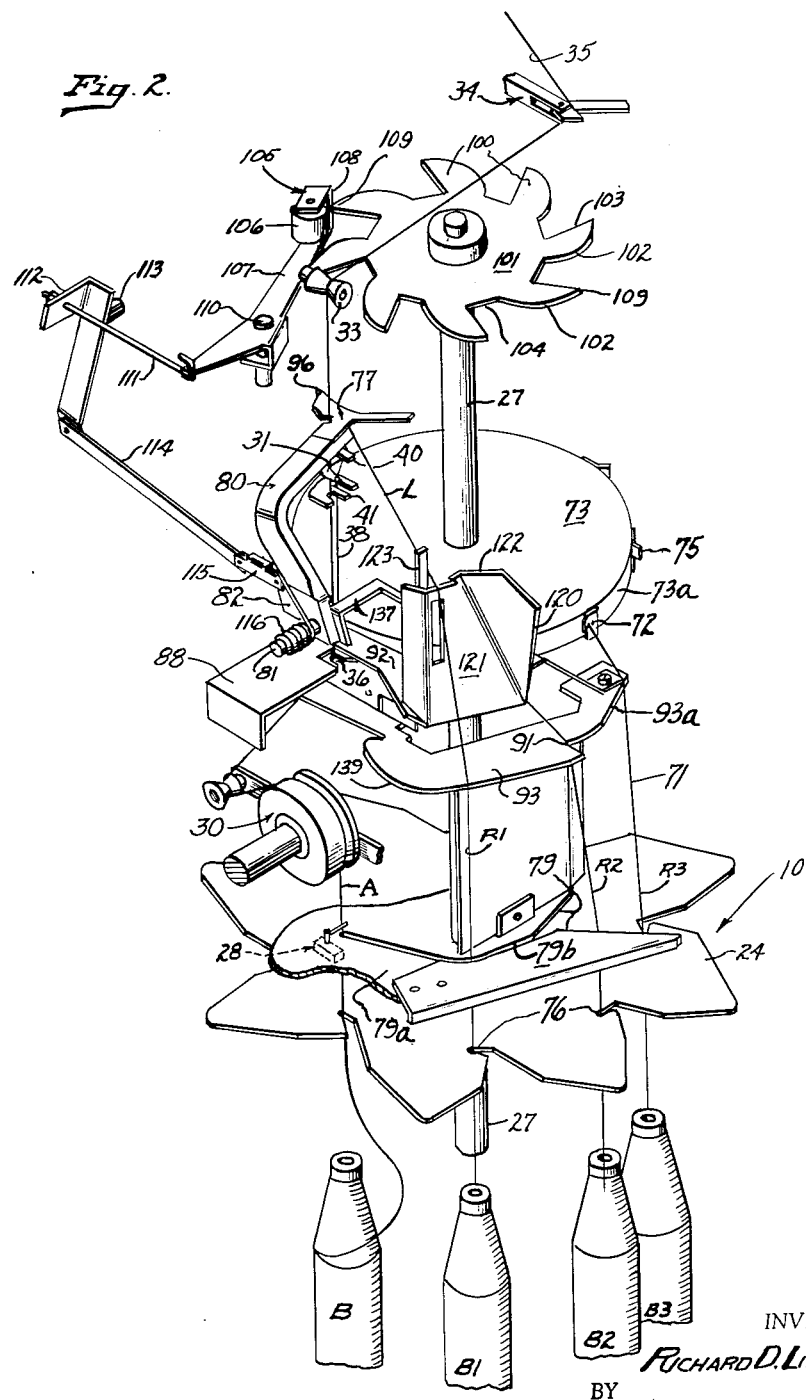
FIG. 2 is a fragmentary perspective view of the principal parts.

With the running and first reserve threads thus positioned relative to the knotter bill 31, the two threads will, as in the patented winder, be tied together by a weaver's knot 43 (FIG. 7) formed instantaneously upon firing of the knotter in the manner fully described in the aforesaid patents. As an incident to this, the clamped end portion of the thread R1 is cut off and released for disposal through the suction tube 132 while the remainder of this thread becomes the running thread and is drawn upwardly past the tip 96 of the finger 77 so that, before the start of the magazine indexing, the first reserve R1 becomes the running thread as shown at the left in FIG. 7. As the short leg of the inverted loop L after being cut off following tying of the knot 43 is drawn upwardly past the tip 96 of the finger 77, the former long leg of the loop is also raised above the upper end of the stop 123 and is thus freed for movement laterally in the indexing direction out of engagement with the plate 121. The thread thus follows along inwardly around the curve 139 of the stationary plate 93 and becomes caught by an L-shaped finger 137 then projecting laterally from the arm 80 near the pivot thereof as shown in FIGS. 2 and 3 with its leg 138 extending horizontally and in a direction opposite the indexing motion. The thread is thus held out of the path of the finger 78 while the latter, immediately thereafter, is moving from its upper position to the lower position (FIG. 4). In the latter movement, the end portion 138 of the projection is swung through a right angle from the catching position (FIG. 3) to the position shown in FIG. 4 thus allowing the thread to slide laterally off from the heel of the projection and enter the notches 133 and 134 by which it is guided into the vertical running position. In this way, the new running thread is held out of the arcuate path Z of movement of the finger 78 to its lower pick-up position and then, as a result of the ensuing upward movement of the finger is freed for sidewise movement along the indexing path to its final running position.

It will be apparent from the foregoing that by the omission of certain parts from the patented winder and the addition of the swingable arm 80 and a few simple guide elements, provision has been made for converting the relatively straight and easily positioned length 71 of the successive reserve threads into the required inverted loop L for enabling a broken thread and a new reserve thread to be tied together without interrupting the high speed winding. Labor costs involved in servicing the winder are thus greatly reduced and the overall operation has been rendered more reliable by virtue of the shorter hung up lengths of the reserve threads.

I claim as my invention:

1. In a winding machine, the combination of, a magazine mounted for indexing about an upright axis and supporting an active bobbin in an unwinding position and adjacent first and second reserve bobbins in spaced relation, means guiding the thread of the active bobbin upwardly along a predetermined path, means holding the thread of the first reserve bobbin in the form of an inverted loop having a short leg lying alongside said path, means hanging up a short unwound length of the second reserve bobbin thread on the magazine with the thread extending upwardly from its bobbin, means for indexing said magazine step by step to carry the reserve bobbins successively to the active winding position, a knotter disposed adjacent said path below the closed upper end of said loop and above the level of said hung-up first reserve thread and operable when actuated to tie the running thread and said short leg together for continuing the winding off from the first reserve bobbin, means responsive to breaking of said running thread to actuate the knotter and initiate indexing of said magazine, and mechanism operable automatically during such indexing to convert said second reserve thread into an inverted loop similar to said first loop and dispose the leading short leg of such second loop along said path in the position formerly occupied by the short leg of said first loop.

2. A winder as defined in claim 1 in which said mechanism includes a loop drawing member normally disposed in an upper position supporting the closed upper end of said first inverted loop and movable after each actuation of said knotter first downwardly to a lower position for picking up said second reserve thread and then upwardly to said normal position to draw said second inverted loop therein.

3. A winder as defined in claim 2 in which the movement of said loop drawing member from said upper position to said lower position is effected before the advance of said magazine by said indexing means.

4. A winder as defined in claim 2 in which said loop drawing member traverses an arcuate path between said upper loop supporting position and said lower thread pick-up position.

5. In a winding machine, the combination of, a magazine mounted for indexing about an upright axis and supporting an active bobbin in an unwinding position and adjacent first and second reserve bobbins in angularly spaced first and second reserve positions, means guiding the thread of the active bobbin upwardly along a predetermined path, means for indexing said magazine step by step to carry the first reserve bobbin to said unwinding position and the second reserve bobbin to said first reserve position, clamps one for each of said bobbins spaced above the latter and indexable with said magazine, said clamps releasably gripping the ends of the threads unwound from the reserve bobbins with the second reserve bobbin thread extending upwardly to its clamp so as to be advanced sidewise toward said unwinding position during the magazine indexing, a thread pick-up member disposed in an upper position above said clamps and supporting the thread of the first reserve bobbin in an inverted J-shaped loop with the shorter leg thereof extending downwardly along said path to its clamp and spaced ahead of the longer leg of the loop in the direction of said indexing, a knotter disposed adjacent said path between said clamps and said member in said upper position and operable when actuated to tie the running thread and said shorter leg together for continuing the winding off from the first reserve bobbin, means responsive to breaking of said running thread to actuate said knotter and initiate indexing of said magazine through one of said steps, means supporting said member for movement back and forth along an arcuate path extending from said upper position outwardly beyond the path of indexing of said unwound thread length to a lower position within such path and opposite the unwound length of the second reserve thread for engaging the latter upon reverse movement of the member, and mechanism operable after each actuation of said knotter and during the next indexing step of said magazine and said clamps to move said member first downwardly to said lower position and then outwardly and upwardly and finally inwardly to said upper position whereby to draw an inverted loop similar to said first loop and dispose the leading short leg thereof alongside said running thread.

6. A winder as defined in claim 5 in which said arcuate path of travel of said loop drawing member is disposed in a plane which converges upwardly from the unwound length of said second reserve thread and toward said running thread and intersects the latter above said knotter.

7. A winder as defined in claim 5 in which the length of said arcuate path is nearly a half revolution.

8. A winder as defined in claim 5 in which said loop drawing member is on the free end of an arm fulcrumed to swing about a fixed axis extending transversely of the axis of indexing of said magazine and between such axis and the axis of said second reserve bobbin.

9. A winder as defined in claim 8 in which the said arm is supported by a pivot disposed outside of the path traversed by unwound lengths of said reserve threads while the latter are being indexed into association with said running thread.

10. A winder as defined in claim 9 in which said arm supporting pivot is disposed above said clamps and below said knotter and between said active and first reserve bobbins with its axis inclined upwardly and inwardly and extending transversely across the indexing axis of said magazine.

11. A winder as defined in claim 9 in which said arm is L-shaped and, when said member is in said upper position, extends upwardly from said pivot and then inwardly toward said magazine axis.

12. A winder as defined in claim 8 in which the loop drawing member comprises a notch opening laterally from the free end of said arm and away from the magazine axis when the member is disposed in said lower position and opens in the direction of the magazine indexing when the member is in said upper position.

13. A winder as defined in claim 12 in which said loop drawng member on the side thereof opposite said notch is formed with a surface inclined relative to the plane of swinging of the notch and acts during the approach of the member to said lower position to cam the second reserve thread laterally as the notch passes the latter.

14. A winder as defined in claim 12 including stationary means engaging the unwound thread of the bobbin in the second reserve position and positioning such thread in the path traversed by said member in moving away from said lower position.

15. A winder as defined in claim 14 in which said stationary means comprises a surface spaced above said member in its lower position and facing in a direction opposite to the indexing motion and adapted to release said second reserve thread therefrom as said member moves outwardly to initiate drawing of said loop.

16. A winder as defined in claim 15 in which said surface is defined by a generally V-shaped stationary notch.

17. A winder as defined in claim 16 in which said thread pick-up member carries the second reserve thread laterally and out of said stationary notch in its initial movement out of said lower position and toward the upper position.

18. A winder as defined in claim 8 including stationary means engageable with said second reserve thread during drawing of the inverted loop therein and disposed between the long and short legs thereof and separating the two legs while said member is in said upper normal position.

19. A winder as defined in claim 18 in which said stationary separating means includes an upwardly extending edge spaced outwardly from the path of the clamp which holds the second reserve thread and operating to separate the legs of the loop during the initial drawing thereof, and an upright stop limiting the advance of the longer leg of said loop during the indexing of said magazine but releasing such leg as the latter is converted into the running thread by actuation of said knotter.

20. A winder as defined by claim 19 including means for catching the longer leg of the drawn loop as it is released from said stop and delaying the advance of such longer leg toward the active winding position until said loop drawing member has moved downwardly and past such longer thread leg.

21. A winder as defined by claim 20 in which said thread catching means comprises a finger projecting laterally from the arm carrying said loop drawing member and near the pivotal axis of such arm.

22. In a winding machine, the combination of, a magazine mounted for indexing about an upright axis and supporting an active bobbin in an unwinding position and adjacent first and second reserve bobbins in spaced upright relation, means guiding the thread of the active bobbin upwardly along a predetermined path, a plurality of clamps spaced above said magazine and along the path of indexing thereof and releasably gripping the ends of unwound lengths of the threads of the corresponding reserve bobbins with the second reserve thread extending upwardly to its corresponding clamp, means for indexing said magazine step by step to carry the reserve bobbins successively to said unwinding position, means including a thread pick-up member movable between a lower pick-up position below said clamps and an upper position above said clamps and, when in said upper position, supporting the thread of the first reserve bobbin in an inverted J-shaped loop with the shorter leg thereof extending downwardly along said path to its clamp and spaced ahead of the longer leg of the loop in the direction of said indexing, a knotter disposed adjacent said path between said clamps and said member in said upper position and operable when actuated to tie the running thread and said shorter leg together for continuing the winding off from the first reserve bobbin, means responsive to breaking of said running thread to actuate said knotter and initiate indexing of said magazine, mechanism actuated by the indexing motion of said magazine to move said member first downwardly to said lower position to pick up said second reserve thread and then upwardly to said upper position and convert such thread into an inverted loop similar to said first loop with the leading short leg of such second loop along said path in the position formerly occupied by the short leg of the first loop.

References Cited by the Examiner
UNITED STATES PATENTS

| | | | |
|---|---|---|---|
| 2,640,654 | 6/1953 | Schweiter | 242—35.6 |
| 3,017,129 | 1/1962 | Trost | 242—35.6 |
| 3,081,045 | 3/1963 | Pitts et al. | 242—35.6 |

MERVIN STEIN, *Primary Examiner.*

STANLEY N. GILREATH, *Examiner.*

W. S. BURDEN, *Assistant Examiner.*